No. 845,975. PATENTED MAR. 5, 1907.
J. PATTERSON.
COMBINED COUPLING PIN AND COMPOUND TOOL.
APPLICATION FILED OCT. 4, 1905.
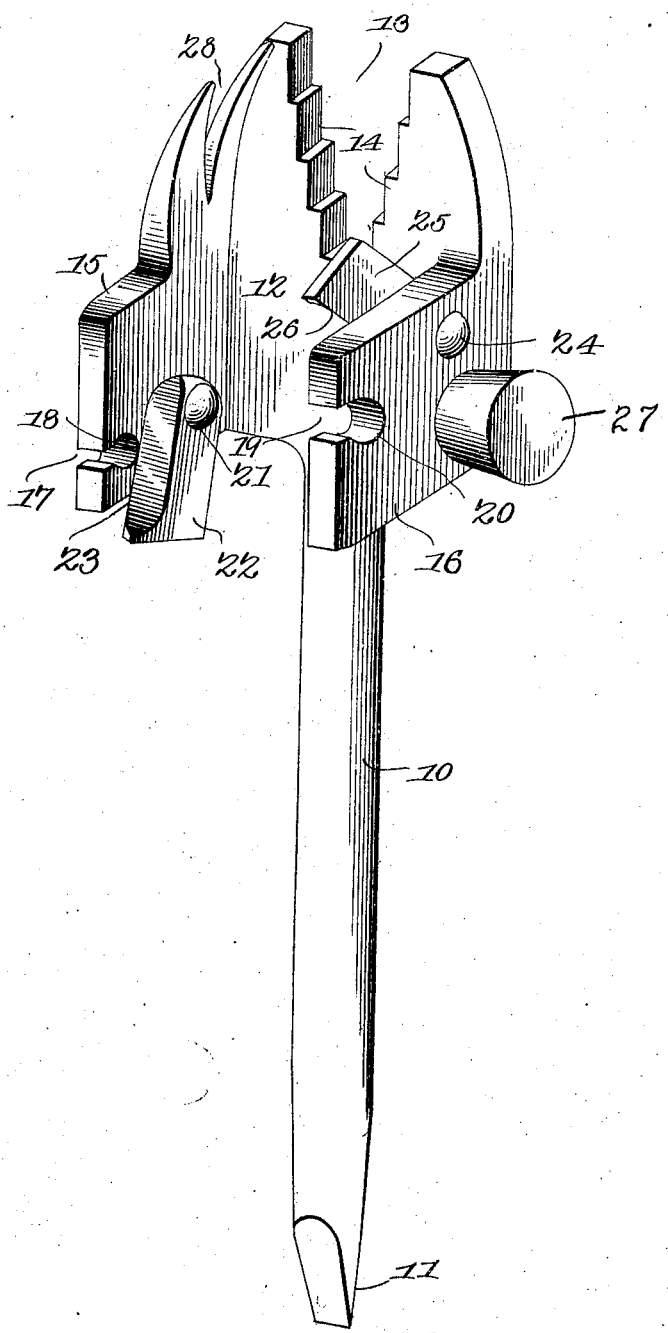
Witnesses
E. J. Stewart
C. N. Woodward
John Patterson,
Inventor,
by C. A. Snow & Co.
Attorneys

UNITED STATES PATENT OFFICE.

JOHN PATTERSON, OF FLESHER, MONTANA.

COMBINED COUPLING-PIN AND COMPOUND-TOOL.

No. 845,975.  Specification of Letters Patent.  Patented March 5, 1907.

Application filed October 4, 1905. Serial No. 281,329.

*To all whom it may concern:*

Be it known that I, JOHN PATTERSON, a citizen of the United States, residing at Flesher, in the county of Lewis and Clarke and State of Montana, have invented a new and useful Combined Coupling-Pin and Compound-Tool, of which the following is a specification.

This invention relates to compound-tools of that type in which various tools are combined with a coupling-pin.

The invention relates primarily to a combined wire-cutter and coupling-pin, and its object is to provide a simple form of compound-tool especially designed for use in agricultural districts.

With these and other objects in view the invention consists of certain novel features of construction and combinations of parts, which will be hereinafter more fully described, and pointed out in the claim.

In the accompanying drawing, which is a perspective view of the implement, the preferred form of the invention has been shown.

Referring to the drawing by characters of reference, 10 is the shank or pin proper of the implement the same having one end tapered, as shown at 11, while a flat head 12 is formed at its other end and provided with a recess 13, extending longitudinally thereinto from its free end, the walls of said recess being stepped, as shown at 14, so that the head can be used as a wrench upon bolts of different sizes. Parallel wings 15 and 16 extend from opposite edges of the head, and the wing 15 is provided with a wire-receiving opening 18, having a contracted throat 17, and another wire-receiving opening 20 is formed within the wing 16 and is also provided with a contracted throat 19. Pivotally mounted upon the inner face of the wing 15, and as shown at 21 is a blade 22, adapted to move upon the inner face of the wing 15 and having a cutting edge 23. Another similar blade 25 is pivoted, as at 24, to the inner face of the wing 16 and has a cutting edge 26. The two blades 22 and 25 are oppositely disposed. A hammer-head 27 extends from the outer face of the wing 16 and a claw 28 is formed upon the wing 15.

As has heretofore been stated the implement herein described is designed for use as a coupling-pin, and as such can be employed as a linchpin for some forms of vehicles, a clevis-pin for some forms of plows and cultivators, &c. Obviously where such a pin is used upon agricultural machines the provision of certain tools which form a part thereof will be found of considerable utility, as these tools will always be convenient for use upon the field. By providing the head of the pin with outstanding wings a wire to be cut can be placed within any one of the recesses 18 and 20, and by striking upward or downward on either of the blades 22 and 25 the wire contained within the recess will be cut. It will be noted that the two blades are oppositely disposed, so that if it is inconvenient to strike downward on one of the blades so as to cut a wire said wire can be placed in the other recess 18 and its blade 22 struck upward by means of a hammer. Where the free end portion is to be cut from a wire, the same can be placed within the recess 18 and bent upward into engagement with the claw 28, which will prevent the wire from slipping. The blade 22 can then be forced against the wire so as to cut it.

What is claimed is—

In an implement of the class described the combination with a shank having a head at one end thereof, and parallel wings extending from the head, each of said heads having a wire-receiving recess with a contracted throat; of oppositely-disposed blades pivotally mounted upon the wings and adapted to swing across one end of each recess, and a wire-engaging claw upon one of the wings.

In testimony that I claim the foregoing as my own I have hereto affixed my signature in the presence of two witnesses.

JOHN PATTERSON.

Witnesses:
JOHN E. STEWART,
R. C. CLEMENTS.